United States Patent

Nicholson

[15] 3,689,610
[45] Sept. 5, 1972

[54] MANUFACTURE OF INSULATED ELECTRIC CABLES

[72] Inventor: Peter Nicholson, Walderslade, Chatham, England

[73] Assignee: British Insulated Callender's Cables Limited, London, England

[22] Filed: June 5, 1969

[21] Appl. No.: 830,712

[30] Foreign Application Priority Data

June 6, 1968 Great Britain..........27,056/68

[52] U.S. Cl. ..................264/40, 264/85, 264/89, 264/90, 264/174, 425/113, 425/149
[51] Int. Cl............................B29f 3/10, B29h 9/08
[58] Field of Search..............264/40, 85, 89, 174, 90; 425/113, 133, 149

[56] References Cited

UNITED STATES PATENTS

| 2,384,224 | 9/1945 | Williams | 264/174 |
| 3,227,786 | 1/1966 | Cohen | 264/174 X |
| 2,369,858 | 2/1945 | Ryan | 18/13 C |
| 2,372,162 | 3/1945 | Ryan | 18/13 C |
| 2,467,642 | 4/1949 | Wilson et al. | 264/172 |
| 2,956,305 | 10/1960 | Raydt et al. | 264/174 X |
| 3,502,752 | 3/1970 | Brown | 264/174 X |
| 3,538,207 | 11/1970 | Toole | 264/89 |

FOREIGN PATENTS OR APPLICATIONS 725,078  1/1966  Canada..................18/13 C Primary Examiner—Robert F. White
Assistant Examiner—J. H. Silbaugh
Attorney—Webb, Burden, Robinson & Webb

[57] ABSTRACT

In the manufacture of an extruded covering on a continuously advancing core by passing the core through the core tube of an extrusion machine which applies a continuous covering on to the core and effecting continuous treatment of the covering by passing the covered core through a chamber sealed to the extrusion machine and containing a fluid medium at superatmospheric pressure, fluid under pressure is injected into the interior of the core tube of the extrusion machine. The injected fluid is maintained at a pressure which is less than that of the fluid medium by an amount such that the pressure difference across the extruded covering at the extrusion orifice is sufficient to cause the extruded covering to collapse firmly on to the core as it emerges from the extrusion machine but is insufficient to force the extruded covering back along the core tube. The pressure difference is preferably automatically maintained constant by a differential pressure control device associated with the chamber and with the core tube.

10 Claims, 4 Drawing Figures

Inventor
PETER NICHOLSON

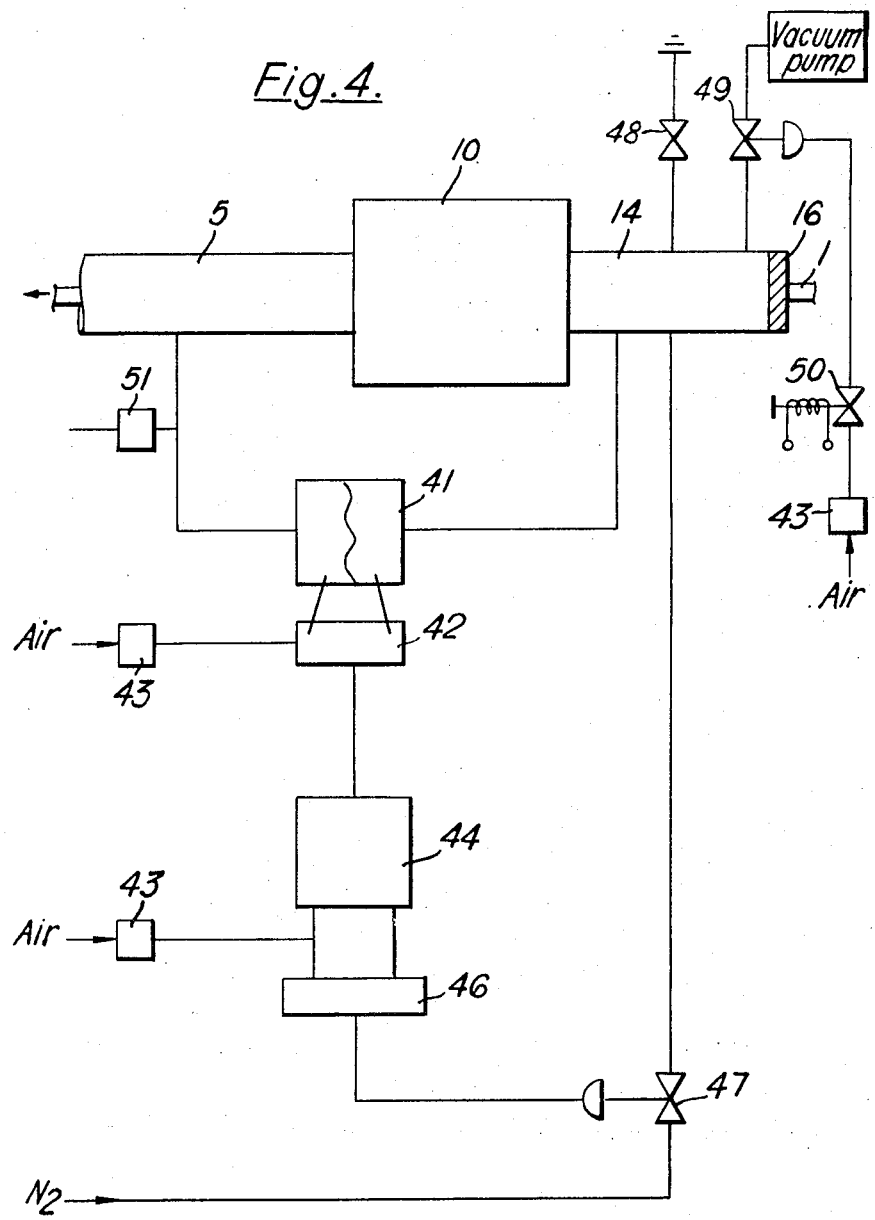

MANUFACTURE OF INSULATED ELECTRIC CABLES

This invention relates to the manufacture of insulated electric cables and wires of the kind in which a covering is extruded directly or indirectly on the cable or wire and the covered cable or wire is then passed continuously through a vessel wherein the covering is cured or strengthened or otherwise treated by the application or abstraction of heat. Examples of such covering materials are natural rubber compositions, synthetic rubber-like compositions such as neoprene (polychlorobutadiene), butyl rubber, silicone rubber and styrene butadiene rubber (GR-S), and synthetic plastics materials such as olefine polymers containing a suitable agent for inducing cross-linking between the molecules of the synthetic plastics materials during the curing process, each of which covering materials may or may not incorporate additives to render it electrically conductive.

The curing of coverings of such materials (all hereinafter included in the term "covering material") generally involves the application of both heat and pressure, usually by maintaining the covered cable or wire in an atmosphere of steam or other suitable fluid curing medium under super-atmospheric pressure for an appropriate period of time. The cooling of coverings of such covering materials in such a way as to prevent the formation of voids between an extruded covering and a cable or wire generally involves the application of a cooling fluid, for instance water, under high pressure for an appropriate period of time. In both the curing and cooling processes the duration of this period will depend upon the particular covering material and upon its chemical and thermal properties, upon the temperature and thermal properties of the fluid treatment medium and upon the thermal capacity of the wire or conductor of the cable.

The cable or wire on to which covering material is extruded may be a bare or previously covered wire or strand, or a group of bare or previously covered wires or strands constituting a cable and, for convenience, all such cables and wires will hereinafter be included in the term "core".

In order to ensure that a fluid curing or cooling medium at super-atmospheric pressure in a treatment chamber does not force covering material being extruded on to a core back along the inner die or point at the outlet end of the core tube in the extrusion machine, the covering material is generally extruded under a pressure sufficient to withstand the super-atmospheric pressure exerted by the fluid curing or cooling medium. While pressure extrusion of a covering material on to a core is quite satisfactory for general purposes, in cases where the extruded covering must be applied to a close tolerance, for instance a covering of radial thickness 0.9 mm (0.036 ins) with a tolerance equal to or less than ±3.5 mils, it is necessary when applying the covering material by pressure extrusion to arrange that the clearance between the core and the inner die or point at the outlet end of the core tube is equal to or less than the tolerance of the radial thickness of the covering that is to be extruded. It follows that the dimensions of the core, of the inner die or point, and of the outer die must also be to a close tolerance in order that the radial thickness of the extruded covering is applied to the desired close tolerance. In the case of cores comprising solid aluminum conductors, and of many cores comprising stranded conductors, such close tolerances may not be economically feasible. While a single length of extruded solid aluminum conductor may be substantially uniform in diameter throughout its length, it has been found that at the present time relatively large variations in diameter occur between a plurality of separate lengths of extruded solid aluminum conductor of the same nominal diameter. As a result for lengths of extruded solid aluminum conductor of the same nominal diameter in order to apply by pressure extrusion a covering of a predetermined radial thickness to a close tolerance it is necessary to provide several different sets of inner dies or points and outer dies. Tooling costs for the manufacture of several such dies sets have the effect of considerably increasing the overall costs of manufacture of a covered solid aluminum conductor, quite apart from the inconvenience of having to change the inner die or point and outer die for a length of solid aluminum conductor of the same nominal diameter whose actual diameter differs from that of the conductors that have previously been covered using this inner and outer die.

It is an object of this invention to provide a method of manufacture of an extruded covering on a core that is free from the disadvantages referred to above.

In accordance with the invention in a method of manufacturing an extruded covering on a continuously advancing core which comprises causing the core to pass through the core tube of an extrusion machine which applies a continuous covering on to the core and effecting continuous treatment of the covering so formed by passing the covered core through a chamber hermetically sealed to the outlet end of the extrusion machine and containing a fluid medium at super-atmospheric pressure, fluid under pressure is injected into the interior of the core tube and is maintained at a pressure which is less than that of the fluid medium by an amount such that the pressure difference across the extruded covering at the extrusion orifice is sufficient to cause the extruded covering to collapse firmly onto the core as it emerges from the extrusion machine but is insufficient to force the extruded covering back along the core tube.

Where the covering is to be cured or strengthened by the application of heat the fluid medium will be steam or other suitable fluid curing medium and the chamber will generally also contain a coolant at substantially the same pressure as the curing medium for cooling the cured covering. Where the treatment of the covering comprises the continuous abstraction of heat therefrom the fluid medium will be water or other suitable fluid cooling medium.

By virtue of the fact that a pressure difference across the extruded covering at the extrusion orifice is employed to collapse the covering firmly onto the advancing core, for manufacture of coverings applied to a close tolerance the internal diameter of the extrusion orifice can be greater than the external diameter of the covering and so the inner die or point and the outer die at the extrusion orifice of the extrusion machine need not be manufactured to the same close tolerance as otherwise would be the case if the covering is applied by pressure extrusion as the wall thickness of the covering can be controlled by varying the throughput speed of the core. Accordingly the same set of inner die or point and outer die can be employed for substantially all cores of the same nominal diameter thereby considerably reducing the tooling costs that would otherwise have been incurred.

The conditions under which the fluid medium is maintained in the treatment chamber will depend upon the composition and mass of the covering material being extruded on the core. For curing a covering of polyethylene steam is preferred as the curing medium and during normal running conditions the pressure of the steam is maintained preferably within the approximate range 133,500 to 147,500 kgm/sq.m. (190 to 210 p.s.i.g.). For cooling a covering of polyethylene it is preferred to use water as the cooling medium and during normal running conditions the water is preferably maintained at a pressure within the approximate range 70,307 to 211,000 kgm/sq.m. (100 to 300 p.s.i.g.).

Injection of the fluid under pressure into the interior of the core tube is preferably controlled by a differential pressure control device associated with the treatment chamber and with the core tube which automatically controls the injection of fluid under pressure into the core tube in order to maintain the pressure difference across the extruded covering at the extrusion orifice at the desired value. The pressure difference maintained across the covering at the extrusion orifice will depend to some extent on the material of the covering and on its radial thickness. For example, where the covering material is polyethylene the pressure difference preferably lies within the approximate range 0.03 to 1.0 atmospheres but with other materials or in other circumstances it could be as high as 3 atmospheres or as low as 0.001 atmospheres.

The fluid injected into the core tube is preferably, but not essentially, an inert gas, such as nitrogen. Where the covering material is polyethylene and the covering has a radial thickness of 0.9 mm (0.036 ins) it is preferred to inject nitrogen into the core tube at a pressure lying within the approximate range 350 to 703 kgm/sq.m (0.5 to 1.0 p.s.i.g.). At initial start-up of the process with the pressure inside the treatment chamber substantially that of atmospheric pressure, it is preferred to evacuate the core tube until the pressure difference across the extruded covering at the extrusion orifice is at a selected value within the aforesaid preferred range and to inject steam and nitrogen, respectively, into the treatment chamber and core tube whilst maintaining a substantially constant pressure difference across the extruded covering by means of the differential pressure control device.

The invention also resides in apparatus for extruding a covering on to an advancing core and for continuously treating the covering with a fluid medium at super-atmospheric pressure, which apparatus comprises an extrusion machine having an annular extrusion orifice which is defined by an outer die and an inner die or point mounted on the front end of a core tube extending through the machine and which has an internal diameter greater than the external diameter of the covering to be extruded, sealing means at the rear end of the core tube which permits passage of the core therethrough, a treatment chamber which is hermetically sealed to the outlet end of the extrusion machine and through which the covered core emerging from the extrusion orifice is adapted to pass, means for introducing a fluid medium under super-atmospheric pressure into the treatment chamber and means for injecting a fluid under pressure to the interior of the core tube.

Preferably the apparatus also includes a differential pressure control device associated with the treatment chamber and with the core tube, whereby the injection of fluid under pressure into the core tube can be automatically controlled to maintain the pressure difference across the extruded covering at the extrusion orifice at the desired value. Preferably also the apparatus includes a vacuum pump connected to the core tube and the vacuum pump may also be controlled by the differential pressure control device, the arrangement being such that a substantially constant pressure difference can be established and maintained across the extruded covering at the extrusion orifice from initial start-up conditions, when the pressure inside the treatment chamber is atmospheric, until normal running conditions are attained.

The invention will now be described in more detail, and by way of example, with reference to the accompanying drawings, in which:

FIG. 4 is a diagrammatic representation of an alternative form of differential pressure control system.

Figure 1:
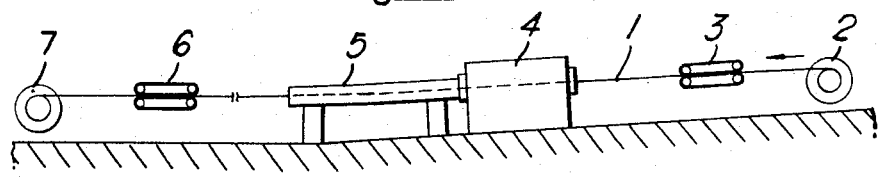
FIG. 1 is a general diagrammatic side elevation of apparatus in accordance with the invention for curing an extruded covering.
Figure 2:
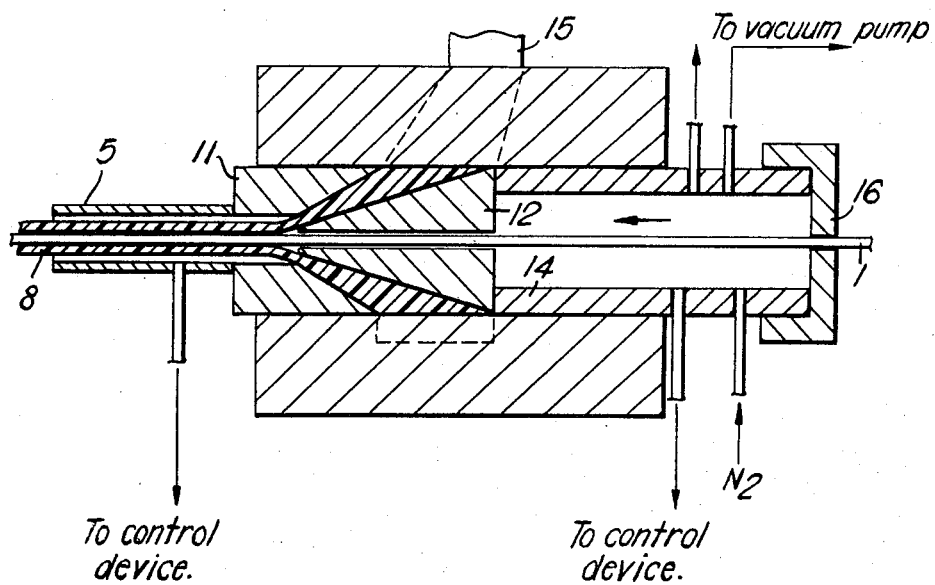
FIG. 2 is a diagrammatic longitudinal cross-section of the head of a cross head extruder forming part of the apparatus.

As will be seen on referring to FIGS. 1 and 2 a bare solid aluminum conductor 1 of substantially sector-shaped cross-section to which an extruded covering of polyethylene is to be applied is drawn from a drum 2 by a haul-off unit 3 and is fed into an extrusion machine 4 where the polyethylene covering is applied. On emerging from the head of the extrusion machine 4 the polyethylene covered conductor 1 passes immediately into an inclined curing chamber 5 filled with steam at super-atmospheric pressure and, at its lower end, with cooling water at the same pressure and hermetically sealed to the outlet end of the extrusion machine from where it travels through vessels of cooling fluid (not shown) and is fed on to a take-up drum 7 by a haul-off unit 6.

The cross-head 10 of the extrusion machine 4 has at its outlet end an annular extrusion orifice defined by an outer die 11 and an inner die or point 12 which is secured to the forward end of a core tube 14 extending through the head. The internal diameter of the outer die 11 is greater than the external diameter of the covered conductor 1. Polyethylene in a plastic state is fed to the annular extrusion orifice through a supply passage 15 where it is applied to the conductor 1. At the rear end of the core tube 14 is a seal 16 which effects a fluid-tight seal with the conductor 1 as it passes into the core tube. The curing chamber 5 hermetically sealed to the cross-head 10 is of substantially cylindrical cross-section and has at its outlet end a seal which effects a fluid-tight seal with the polyethylene covered conductor as it emerges from the chamber.

During extrusion of a polyethylene covering 8 on the conductor 1 and curing of the extruded covering in the curing chamber 5, the steam in the curing chamber will be at super-atmospheric pressure, e.g. a pressure within the range 133,500 to 147,500 kgm/sq.m. (190 to 210 p.s.i.g.) and the pressure difference across the extruded covering 8 at the extrusion orifice is maintained substantially constant at a pressure within the approximate range 0.03 to 0.07 atmospheres.

By this method a polyethylene covering 8 of radial thickness 0.9 mm (0.036 in) can be applied to a sector-shaped conductor 1 with a tolerance of + or − 0.05 mm (0.002 ins).

Figure 3:
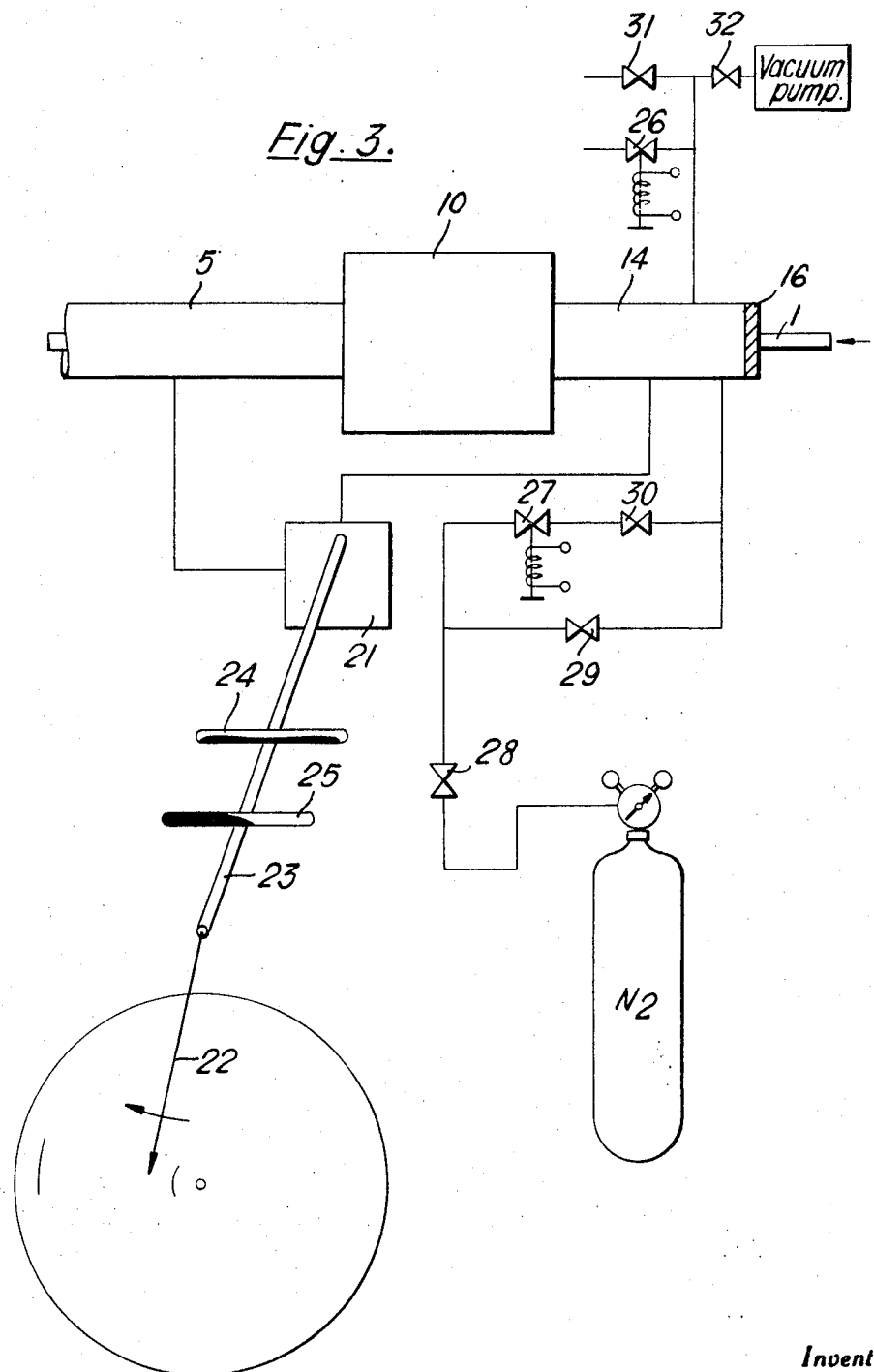
FIG. 3 is a diagrammatic representation of one form of differential pressure control system for use in the apparatus of the present invention.

Two alternative forms of differential pressure control system for maintaining the substantially constant pressure difference across the extruded covering 8 as it emerges from the extrusion orifice of the extrusion machine 4 are shown in FIGS. 3 and 4.

In the first differential pressure control system shown in FIG. 3 a differential pressure control device 21 of the twin bellows type (operating in a similar manner to an aneroid barometer) is associated with the curing chamber 5 and with the core tube 14 and has a pointer 22 which indicates on a chart the pressure difference across the extruded covering 8 at the extrusion orifice. The shaft 23 of the pointer 22 carries two mercury bulb switches 24 and 25. Switch 24 is adapted to actuate a solenoid valve 26 which controls leakage of nitrogen from the core tube 14 and switch 25 is adapted to actuate a solenoid valve 27 which controls injection of nitrogen under pressure into the interior of the core tube. The switches 24 and 25 are suitably circumferentially spaced on the shaft 23 with respect to a predetermined reading of the pressure difference across the extruded covering 8 at the extrusion orifice in such a way that each is closed or opened at an appropriate error in pressure difference across the extruded covering to effect opening or closing of its respective solenoid valve 26 or 27 and to produce the necessary compensating action. Valves 28, 29 and 30 are provided for manual control of injection of nitrogen and valve 31 is provided for manual control of leakage of nitrogen. Valve 32 controls a vacuum pump used during initial start-up of the apparatus.

In operation, if the pointer 22 records a decrease in pressure difference across the extruded covering 8 at the extrusion orifice in excess of a predetermined amount the switch 24 will close to open automatically the valve 26 and cause nitrogen to leak from the core tube 14 until the required pressure difference is raised and the switch 24 re-opens and thus effects closure of the valve 26. Conversely, if an increase in pressure difference above a predetermined amount is recorded by the pointer 22 switch 25 will close and will cause valve 27 to open automatically to allow nitrogen to be injected into the core tube 14 until the pressure difference decreases to such a value that switch 25 will open and cause valve 27 to close. By manual control of valve 28 the extrusion machine operator can over-ride the automatic control if necessary during rapid changes in steam pressure or level of cooling water in the chamber 5, e.g. during start-up or shut down.

In the system shown in FIG. 4 a differential pressure cell 41 is associated with the curing chamber 5 and core tube 14 and is connected through a mechanical-pneumatic-transducer 42, fed with air through a filter regulator 43, to a receiver/controller 44. The receiver/controller 44 is connected through an auto/manual station 46 to a diaphragm flow valve 47 which controls continuous injection of nitrogen into the core tube 14. Continuous leakage of nitrogen from the core tube 14 is allowed to take place through a valve 48. A diaphragm flow valve 49 controls a vacuum pump used to evacuate the core tube 14 when starting up the apparatus.

In operation, the differential pressure cell 41 transmits through the transducer 42 a pneumatic signal, proportional to the pressure difference across the extruded covering 8 at the extrusion orifice, to the receiver/controller 44 which generates a pneumatic power signal for controlling the diaphragm flow valve 47. This signal is proportional to the error between the measured pressure difference across the extruded covering 8 and a level of pressure difference pre-set in the receiver/controller 44. In accordance with the signal received the diaphragm flow valve 47 will automatically either open or close to increase or decrease the flow of nitrogen into the core tube 14. The diaphragm flow valve 49 associated with the vacuum pump may also be automatically controlled by a solenoid valve 50 adapted to be actuated by a pressure switch 51 connected to the chamber 5, which will actuate the valve to close the diaphragm flow valve when the pressure in the chamber rises above atmospheric pressure.

The automatic/manual station 46 provides for manual control of the flow valve 47 if desired.

In addition to the advantages referred to above our invention has the very important advantage that the method and apparatus can be employed in the manufacture of extruded coverings on shaped cores of other than circular cross-section, for instance cores of sector shape, with substantially the same degree of close tolerance in the radial thickness of the extruded covering as that of coverings for equivalent cores of circular cross-section. Moreover, the method of the invention can be effected on cores of shaped cross-section using inner dies or points and outer dies of circular cross-section of an appropriate diameter, thereby providing a considerable saving in the cost of tooling of die sets. The method of the invention has the further advantage that by appropriately selecting a predetermined pressure difference across an extruded covering at the extrusion orifice, the distance between the extreme end of the inner die or point and the place where the extruded covering is forced on to the conductor, generally termed the float-down distance, can be so arranged as to preclude the formation of ridges of insulating material at the apices of a shaped conductor; this is especially important where the inner die or point and outer die are of circular cross-section.

What I claim as my invention is:

1. In the manufacture of an extruded covering on a continuously advancing core by means of an extrusion machine having a core tube extending through the machine, an inner die or point mounted on the front end of the core tube and an outer die at the outlet end of the machine which defines with the inner die or point an annular extrusion orifice having an internal diameter substantially greater than the external diameter of the extruded covering and by a float-down process in which the core is drawn through the core tube of the extrusion machine, a continuous covering is applied to the core at the extrusion orifice and a pressure difference is maintained across the extruded covering at the extrusion orifice sufficient to cause the extruded covering to collapse firmly on to the core as it emerges from the extrusion machine but insufficient to force the extruded covering back along the core tube, the radial thickness of the extruded covering being controlled by varying the speed at which the core is drawn through the extrusion machine, the improvement comprising a. continuously treating the covering so formed with a fluid medium at super-atmospheric pressure by passing the covered core through a chamber hermetically sealed to the outlet end of the extrusion machine and containing the fluid medium at super-atmospheric pressure;

b. injecting fluid under pressure into the interior of the core tube, and c. maintaining the fluid in the core tube at a pressure which is less than that of the fluid medium by an amount such that the said pressure difference across the extruded covering at the extrusion orifice is maintained.

2. A method as claimed in claim 1, wherein the treatment of the covering is a curing process.

3. A method as claimed in claim 1, wherein the treatment of the covering is a cooling process.

4. A method as claimed in claim 1, wherein the fluid injected under pressure into the interior of the core tube is automatically maintained at a pressure which is less than that of the fluid medium by a substantially constant predetermined amount by means of a differential pressure control device associated with the treatment chamber and with the core tube which automatically controls the injection of fluid into the core tube.

5. A method as claimed in claim 4, wherein the differential pressure control device also automatically controls leakage of fluid from the core tube.

6. A method as claimed in claim 4, wherein fluid is permitted to leak continuously from the core tube and is continuously injected into the core tube under the automatic control of the differential pressure control device.

7. A method as claimed in claim 4, wherein at initial start-up of the process with the pressure inside the treatment chamber substantially that of atmospheric pressure, the core tube is evacuated until the pressure difference across the extruded covering at the extrusion orifice is at a predetermined value, and the fluid treatment medium and the core tube fluid, respectively, are injected into the treatment chamber and core tube while a substantially constant pressure difference is maintained across the extruded covering at the extrusion orifice by means of the differential pressure control device.

8. A method as claimed in claim 4, wherein the pressure difference across the extruded covering at the extrusion orifice is maintained at a value lying within the approximate range 0.03 to 1.0 atmospheres.

9. A method as claimed in claim 8, wherein the pressure difference across the extruded covering at the extrusion orifice is maintained at a value lying within the approximate range 0.03 to 0.2 atmospheres.

10. A method as claimed in claim 4, wherein the fluid injected into the core tube is an inert gas.

* * * * *